Dec. 7, 1954   A. L. BAKER   2,696,054
TROUGH COMPASS
Filed April 14, 1950
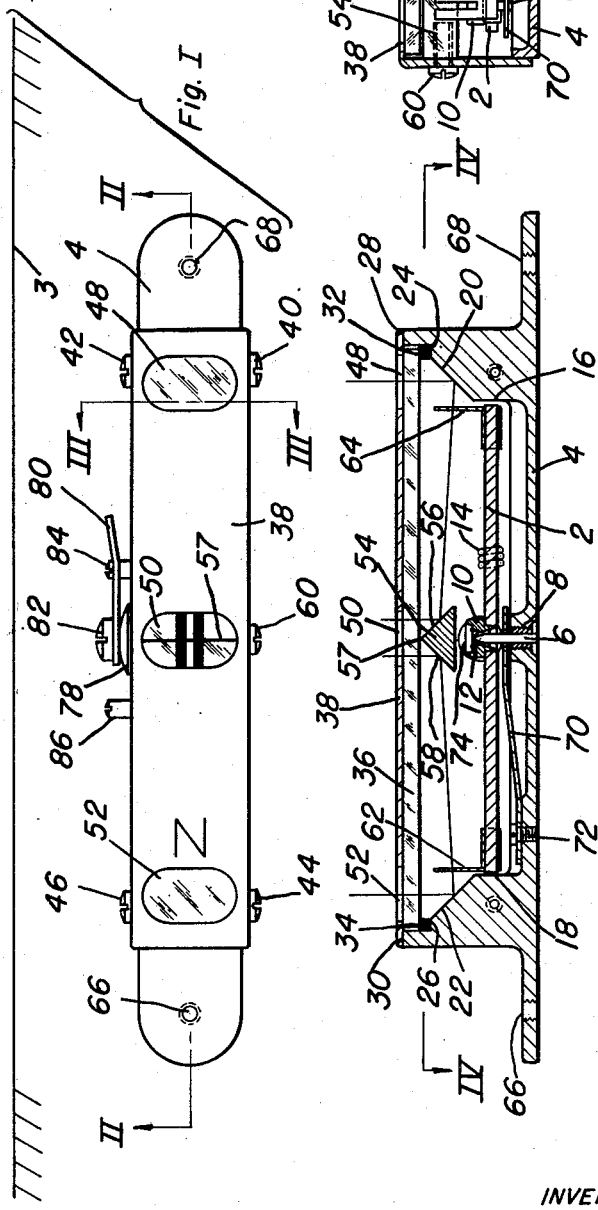
INVENTOR
ALLISTER L. BAKER
BY
ATTORNEY to# United States Patent Office 2,696,054
Patented Dec. 7, 1954

2,696,054

TROUGH COMPASS

Allister L. Baker, Denville, N. J., assignor to Keuffel & Esser Company, Hoboken, N. J., a corporation of New Jersey Application April 14, 1950, Serial No. 155,890

2 Claims. (Cl. 33—222)

This invention relates to magnetic compasses. More particularly it relates to trough compasses of the type commonly used by surveyors on plane table alidades, theodolites and the like.

A conventional plane table alidade is provided with a sighting telescope, a straight edge and a trough compass. The reference lines established by the straight edge and the line of sight of the telescope are parallel so that when the alidade rests on a plane table and the telescope is sighted at a target, the straight edge may be used to draw a line in the direction of the target. The trough compass provides means whereby the reference lines may be pointed in the direction of magnetic north or at some predetermined direction to magnetic north. A cross reference line (which may be imaginary) on the trough compass is set at a predetermined angle usually 90° to the reference lines of the instrument. The straight edge can then be used to draw a line in the direction of magnetic north or the telescope can be used to locate a target in the direction of magnetic north.

Similarly when used on a theodolite, the trough compass can be used to point the telescope line of sight in the direction of magnetic north so that a target in the direction of magnetic north may be located or more usually so that the horizontal circle may be set to read all angles from the direction of magnetic north. In this latter case the cross reference line of the trough compass is set at a predetermined angle usually 90° to the line of sight of the theodolite telescope.

The conventional trough compass consists of a container having a compass needle pivotally mounted within it to swing through a limited angle in a horizontal plane. An index mark fixed with respect to the container is provided which can be aligned with one end of the compass needle. In use, the container is so positioned on the alidade or theodolite that the reference line extends in the direction of magnetic north or at some predetermined angle thereto when the end of the compass needle is aligned with the index mark.

It is an object of this invention to provide a trough compass which is read more accurately because it is aligned by optically setting an index on one end of the compass needle against an index provided on the other end of the compass needle.

Another object of this invention is to provide a trough compass which is magnetically damped and which will therefore come to rest quickly.

A further object of the invention is to accomplish the above two objects in a simple device which can be produced in quantity.

These and other objects of the invention and the method of their attainment will be more readily understood by reference to the following description taken in connection with the accompanying drawing in which:

Fig. I is a view in plan of the new trough compass.

Fig. II is a view in sectional elevation taken along the line II—II of Fig. I and looking in the direction of the arrows.

Fig. III is a view in sectional end elevation taken along the line III—III of Fig. I and looking in the direction of the arrows.

Fig. IV is a view in plan showing the new trough compass with the shield which covers the top of the compass broken away and the needle rotated out of coincidence.

Referring to the figures, the magnetized compass needle 2 is mounted above an elongated base 4. A pivot pin 6 is mounted at the center of the elongated base 4 and extends upward therefrom. In the construction shown, the pivot pin 6 is pressed into the screw 8 which is threaded into the elongated base 4. The pivot pin 6 is pointed at its upper end. The magnetized compass needle 2 is provided with a threaded hole at its center. The jewel mount 10 containing a jewel 12 is secured to the magnetized needle 2 by means of this threaded hole. The jewel 12 rests on the point of the pivot pin 6 so that the compass needle 2 is free to swing in a horizontal plane.

The compass needle 2 can also swing slightly in the vertical direction. This allows for the magnetic dip which causes the north end of the compass needle to depress in the Northern Hemisphere and the south end of the needle to depress in the Southern Hemisphere. A counterbalance weight 14 in the form of a wire is provided to counteract the magnetic dip. It is shown on the south end of the needle as would be the case for a compass used in the Northern Hemisphere. The counterbalance weight 14 is adjustable by merely sliding the wire along the compass needle and can be set to counteract the dip at any latitude.

The elongated base 4 is made of a material of high electrical conductivity such as high purity copper and extends upward beyond the ends of the compass needle 2. The surfaces 16 and 18 are parts of a cylinder having its axis on the center line of the pivot pin 6 as shown in Fig. IV. The ends of the compass needle 2 are not pointed but are preferably rounded to a radius extending from the axis of the pivot pin. The compass needle 2 has a relatively large cross section at its ends compared to the cross section at the center; i. e., the ratio of these cross sections is a large fraction of unity. The cross section of the compass needle could be uniform over the entire length and all the way out to the ends but in the construction shown the width is cut down somewhat near the ends for reasons to be more fully explained. The clearance between the ends of the compass needle 2 and the surfaces 16 and 18 is held to a minimum. If this construction is followed and the compass needle 2 is made from a material of high magnetic strength and the elongated base 4 is made of a material of high electrical conductivity, the compass needle 2 will be magnetically damped and will come to rest very rapidly.

Beyond the ends of the compass needle 2, the elongated base 4 extends above the compass needle 2 and forms inclined surfaces 20 and 22 facing upward and inward. Shoulders 24 and 26 are provided above the surfaces 20 and 22. The extensions of the base 4 end in top surfaces 28 and 30. Resilient strips of packing material 32 and 34 are provided on each of the shoulders 24 and 26. A glass plate 36 rests on the resilient strips of packing material 32 and 34.

A shield 38 of U-shaped cross section fits over the glass plate 36 and extends downward on each side to enclose the space between the upward extending ends of the elongated base 4. This shield also limits the swing of the compass needle but this is not a disadvantage in a trough compass. The shield 38 presses downward against the glass plate 36 and compresses the resilient strips of packing material 32 and 34 to engage the surfaces 28 and 30. The sides of the shield 38 are secured to the elongated base 4 as by means of screws 40, 42, 44 and 46. Openings are provided in the shield 38 at 48, 50 and 52.

The shield 38 also carries an element 54 having inclined surfaces 56 and 58 facing upward and outward. The element 54 is secured to the wall of the shield 38 by the screw 60 so that when the shield is in assembled position the element 54 is positioned over the center of the compass needle. The inclined surfaces 56 and 58 intersect in a sharp edge 57 which is in a plane substantially perpendicular to the length of the compass needle.

Any equivalent arrangement of reflecting surfaces may be used. The surfaces may be curved instead of planar. For example, they may be parts of a semicylindrical surface having an axis in a plane substantially perpendicular to the length of the compass needle. In any event the reflecting surfaces will be generated by a line parallel to the cross reference line. In use the trough compass will be set so that this cross reference line is at a predetermined angle with respect to a reference line 3 on the instrument in conjunction with which the compass is used. If the index means 62 and 64 provided on each end of the compass needle 2 are aligned with the magnetic axis of the needle, the predetermined angle will be 90° when it is desired that the instrument reference line 3 should be oriented in the direction of magnetic north by the compass.

In the embodiment shown the index means 62 and 64 are made of sheet metal. The sheet metal is bent around the ends of the compass needle 2 at the region of reduced width and a portion of the sheet is bent to extend upward in a substantially vertical plane above each end of the needle. Each of the sheet metal pieces has an open slot in its vertical portion which serves as the index mark. However, it should be understood that the index mark could also be formed by an opaque instead of an open section.

The inclined surfaces 20 and 22 are provided with diffuse reflecting surfaces. This can be accomplished quite satisfactorily merely by covering these surfaces with a white paint but they could also be etched or ground to form a matte surface and coated with a metallic reflecting material. The inclined surfaces 56 and 58 are provided with specular reflecting surfaces. If the element 54 is made of a metal such as brass, this can be accomplished very readily by polishing the surfaces and electroplating them with chromium or any other metal with high reflecting power. If the element 54 is made of glass, the surfaces can be polished by optical methods and coated with a reflecting film of aluminum or the like by high vacuum technique.

In use of the compass, light from above (from the sky) passes through the openings 48 and 52 in the shield 38 and through the glass plate 36 and is reflected by the inclined diffuse reflecting surfaces 20 and 22 in a horizontal direction past both of the index means toward the region over the center of the compass needle to illuminate the index means in silhouette. This light is reflected upward by the specular reflecting surfaces 56 and 58 so that the index means 62 and 64 may be viewed simultaneously from above.

Means for holding the compass needle 2 off the pivot pin 6 when the trough compass is not in use are provided as follows. The leaf spring 70 is secured to the base 4 as by means of the screw 72. The leaf spring 70 is provided with a hole through which the pivot pin 6 passes. When released the leaf spring will push the compass needle upward off the pivot pin 6 until the jewel mount 10 comes in contact with the bottom surface of the reflecting element 54.

In Figures II and III, the leaf spring 70 is held out of contact with the compass needle 2 by the cam 74. The cam 74 is merely a short rod cut away on the inside end as shown and having a reduced diameter on the other end. The wall 76 of the shield 38 is provided with a hole to receive the reduced end of the cam rod 74 so that the cam is shouldered on the inside of the wall. The reduced end of the cam rod 74 also passes through the spring washer 78 and is keyed to the lever arm 80. The screw 82 is threaded into the reduced end of the cam rod 74 and holds the assembly together with slight compression of the spring washer 78 so that the cam will tend to remain in the position in which it is set. The inner end of the cam 74 engages the leaf spring 70 in the position shown. When turned to the 180° opposite position the cut out part of the cam will be over the leaf spring 70 allowing it to rise and lift the compass needle 2. Pins 84 and 86 are provided to limit the motion of the lever arm 80. When the arm 80 is in contact with pin 84 as shown the compass needle 2 is free to swing on the pivot pin 6 and when the arm 80 is in contact with pin 86, the compass needle 2 is held between the leaf spring 70 and the reflecting element 54.

Two holes 66 and 68 are provided at the ends of the elongated base 2. Screws may be inserted through these holes to secure the trough compass to the blade of a plane table alidade. If the trough compass is to be used on a different type of instrument such as a theodolite other means of fastening may be used. The base 2 is usually fastened to the instrument in such a position that when the reference line (e. g. the straight edge of the alidade blade) extends in the direction of magnetic north the index means 62 and 64 will appear in alignment as seen through the opening 50 and as shown in Fig. I. Under these conditions, the cross reference line will make a predetermined angle with the reference line of the instrument.

Having thus described the invention, what is claimed is:

1. A trough compass for setting a cross reference line at a predetermined angle with respect to magnetic north comprising an elongated base, a magnetized compass needle pivotally mounted at its center to swing in a substantially horizontal plane above said base, index means mounted on each end of said magnetized compass needle in a substantially vertical plane extending above each end of said magnetized compass needle, said base extending beyond and above the ends of said magnetized compass needle to provide inclined surfaces facing upward and inward, said inclined surfaces being provided with diffuse reflecting surfaces to direct light in a horizontal direction past both of said index means toward the region over the center of said compass needle for illuminating said index means in silhouette, a shield covering said magnetized compass needle and extending downward around it to said base thereby limiting the swing of said compass needle and an element mounted on the inside of said shield over the center of said magnetized compass needle, said element having two inclined specular reflecting surfaces facing upward and outward and meeting at a sharp horizontal edge parallel to said cross reference line, said shield being provided with light transmitting openings permitting light to pass downward toward said diffuse reflecting surfaces and to pass upward from said specular reflecting surfaces, said specular reflecting surfaces reflecting light from each of said index means whereby said index means mounted on opposite ends of said magnetized compass needle may be viewed simultaneously from above so that when the cross reference line is oriented to make the predetermined angle with respect to magnetic north said index means will appear in alignment.

2. A trough compass for mounting upon a narrow support comprising an elongated body of highly conductive material having a base and an upstanding lug at each end and being open at the sides between said lugs providing a maximum open space for the width of the base, a pivot pin projecting up from said base, a magnetic needle having blunt ends mounted on said pivot pin, indicator means on said needle, a cover of thin sheet material and of inverted channel shape mounted on said body and snugly engaging the sides of the base and the lugs, means to secure the cover on said body, a spring mounted on the base for urging said needle upwardly off its pivot pin, manually movable means on said cover for operative engagement with said spring for selectively depressing said spring for releasing said needle for pivotal movement on the pivot pin, and means on said channel member for retaining said needle on said pivot pin, whereby the compass needle is retained in assembled operative relation by said cover when the manually movable means on the side of the cover is in operative position with respect to the spring, said cover having light transmitting portions for illuminating the indicator means and providing for viewing of the indicator means.

References Cited in the file of this patent

UNITED STATES PATENTS

| Number | Name | Date |
|--------|------|------|
| 1,502,223 | Abraham | July 22, 1924 |
| 1,508,585 | Wild | Sept. 16, 1924 |
| 2,127,878 | Martin | Aug. 23, 1938 |
| 2,192,138 | Langsner | Feb. 27, 1940 |
| 2,424,254 | Sawyer | July 22, 1947 |
| 2,633,639 | Suverkrop | Apr. 7, 1953 |

FOREIGN PATENTS

| Number | Country | Date |
|--------|---------|------|
| 13,982 | Great Britain | Feb. 23, 1852 |
| 353,615 | Great Britain | July 30, 1931 |
| 590,789 | Germany | Jan. 13, 1934 |
| 606,937 | Germany | Dec. 13, 1934 |